United States Patent
Chen et al.

(10) Patent No.: US 10,685,123 B2
(45) Date of Patent: *Jun. 16, 2020

(54) METHOD FOR VALIDATING AN UNTRUSTED NATIVE CODE MODULE

(71) Applicant: Google LLC, Mountain View, CA (US)

(72) Inventors: J. Bradley Chen, Los Gatos, CA (US); Matthew T. Harren, Fremont, CA (US); Matthew Papakipos, Palo Alto, CA (US); David C. Sehr, Cupertino, CA (US); Bennet S. Yee, Mountain View, CA (US)

(73) Assignee: Google LLC, Mountain View, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/651,150

(22) Filed: Jul. 17, 2017

(65) Prior Publication Data
US 2018/0004959 A1    Jan. 4, 2018

Related U.S. Application Data

(63) Continuation of application No. 15/172,879, filed on Jun. 3, 2016, now Pat. No. 9,710,654, which is a
(Continued)

(51) Int. Cl.
*G06F 21/51* (2013.01)
*G06F 21/57* (2013.01)

(52) U.S. Cl.
CPC ............ *G06F 21/577* (2013.01); *G06F 21/51* (2013.01)

(58) Field of Classification Search
CPC ................................. G06F 21/50; G06F 21/51
See application file for complete search history.

(56) References Cited

U.S. PATENT DOCUMENTS

| 5,974,549 A | 10/1999 | Golan |
| 5,987,245 A | 11/1999 | Gish |

(Continued)

FOREIGN PATENT DOCUMENTS

| CN | 1834906 A | 9/2006 |
| WO | 9910795 A1 | 3/1999 |

OTHER PUBLICATIONS

Klinkoff et al. Extending .NET security to unmanaged code Jul. 17, 2007 Springer-Verlag (Year: 2007).*
(Continued)

*Primary Examiner* — David J Pearson
(74) *Attorney, Agent, or Firm* — Botos Churchill IP Law

(57) ABSTRACT

A system that validates a native code module. During operation, the system receives a native code module comprised of untrusted native program code. The system validates the native code module by: (1) determining that code in the native code module does not include any restricted instructions and/or does not access restricted features of a computing device; and (2) determining that the instructions in the native code module are aligned along byte boundaries such that a specified set of byte boundaries always contain a valid instruction and control flow instructions have valid targets. The system allows successfully-validated native code modules to execute, and rejects native code modules that fail validation. By validating the native code module, the system facilitates safely executing the native code module in the secure runtime environment on the computing device, thereby achieving native code performance for untrusted program binaries without significant risk of unwanted side effects.

20 Claims, 9 Drawing Sheets

Related U.S. Application Data continuation of application No. 14/463,345, filed on Aug. 19, 2014, now Pat. No. 9,361,453, which is a continuation of application No. 12/117,634, filed on May 8, 2008, now Pat. No. 9,058,483.

(56) References Cited

U.S. PATENT DOCUMENTS

| | | | |
|---|---|---|---|
| 6,128,774 A * | 10/2000 | Necula | G06F 9/44589 717/126 |
| 6,275,938 B1 | 8/2001 | Bond et al. | |
| 6,282,702 B1 * | 8/2001 | Ungar | G06F 9/45504 717/148 |
| 6,697,971 B1 * | 2/2004 | Dwyer | G06F 9/3824 711/E12.101 |
| 6,738,469 B1 | 5/2004 | Peirce et al. | |
| 7,076,042 B1 | 7/2006 | Praturi et al. | |
| 7,188,282 B2 | 3/2007 | Walmsley | |
| 7,257,615 B2 | 8/2007 | Eilers et al. | |
| 7,581,103 B2 | 8/2009 | Home et al. | |
| 7,596,694 B1 * | 9/2009 | Karp | H04L 63/123 713/164 |
| 8,151,349 B1 | 4/2012 | Yee et al. | |
| 9,058,483 B2 * | 6/2015 | Chen | G06F 21/577 |
| 9,361,453 B2 * | 6/2016 | Chen | G06F 21/577 |
| 9,710,654 B2 * | 7/2017 | Chen | G06F 21/577 |
| 2003/0005048 A1 | 1/2003 | Risalvato | |
| 2003/0018834 A1 | 1/2003 | Eilers et al. | |
| 2003/0126311 A1 | 7/2003 | Kushnirskiy et al. | |
| 2004/0123117 A1 | 6/2004 | Berger | |
| 2004/0158813 A1 | 8/2004 | Xia et al. | |
| 2004/0172530 A1 | 9/2004 | Birk et al. | |
| 2004/0193679 A1 | 9/2004 | Tecco et al. | |
| 2004/0230949 A1 | 11/2004 | Talwar et al. | |
| 2005/0193380 A1 * | 9/2005 | Vitanov | G06F 9/451 717/143 |
| 2005/0273605 A1 * | 12/2005 | Saha | G06F 21/53 713/166 |
| 2005/0283770 A1 * | 12/2005 | Karp | G06F 11/3624 717/151 |
| 2006/0123279 A1 * | 6/2006 | Cardinell | G06F 8/54 714/718 |
| 2006/0143689 A1 * | 6/2006 | Yu | G06F 9/44589 726/1 |
| 2006/0174077 A1 | 8/2006 | Abadi | |
| 2007/0107057 A1 | 5/2007 | Chandler | |
| 2007/0157298 A1 | 7/2007 | Dingwall et al. | |
| 2007/0169110 A1 | 7/2007 | Gupta et al. | |
| 2007/0261124 A1 | 11/2007 | Centoze | |
| 2007/0266373 A1 * | 11/2007 | Liu | G06F 9/44589 717/126 |
| 2008/0016339 A1 * | 1/2008 | Shukla | G06F 21/53 713/164 |
| 2008/0047023 A1 * | 2/2008 | Lam | G06F 21/52 726/30 |
| 2008/0071884 A1 | 3/2008 | Heithcock et al. | |
| 2008/0155679 A1 * | 6/2008 | Sebot | G06F 21/556 726/16 |
| 2008/0163366 A1 * | 7/2008 | Chinya | G06F 9/468 726/21 |
| 2008/0172661 A1 | 7/2008 | Chatterjee et al. | |
| 2008/0320436 A1 | 12/2008 | Hughes | |
| 2009/0007223 A1 | 1/2009 | Centonze | |
| 2009/0210347 A1 | 8/2009 | Sarcanin | |
| 2009/0210874 A1 | 8/2009 | Wilson et al. | |
| 2009/0271501 A1 | 10/2009 | Shenfield et al. | |
| 2009/0282474 A1 | 11/2009 | Chen et al. | |
| 2009/0282477 A1 | 11/2009 | Chen et al. | |
| 2010/0013842 A1 | 1/2010 | Green et al. | |
| 2014/0026214 A1 | 1/2014 | Adams et al. | |
| 2017/0262657 A1 | 9/2017 | Salmon-Legagneur et al. | |

OTHER PUBLICATIONS

Extended European Search Report for European Patent Application No. EP 18179497.5, dated Sep. 25, 2018. 9 pages.

Weber, M. et al., "A toolkit for detecting and analyzing malicious software", Proceedings on 18th Annual Computer Security Applications Conference, Dec. 9-13, 2002, pp. 423-431.

Apap, F. et al., "Detecting Malicious Software by Monitoring Anomalous Windows Registry Access", Recent advances in intrusion detection, Springer, 2002, pp. 36-53.

U. Erlingsson, M. Abadi, M. Veable, M. Budiu, and G. Necula, XFI: Software guards for system address spaces. In OSDI '06: 7th Symposium on Operating Systems Design and Implementation, pp. 75-88, Nov. 2006.

B. Ford, VXA: A virtual architecture for durable compressed archives. In USENIX File and Storage Technologies, Dec. 2005.

S. McCamant and G. Morrisett, Evaluating SFI for a CISC architecture. In 15th USENIX Security Symposium, pp. 1-16, Aug. 2006.

G. Necula, Proof carrying code. In Principles of Programming Languages, pp. 1-14, 1997.

V. Prasad, W. Cohen, FC Eigler, M. Hunt, J. Keniston, and JB Chen, Locating system problems using dynamic instrumentation, In 2005 Ottawa Linux Symposium, pp. 49-64, Jul. 2005.

Robert Wahbe, Steven Lucco, Thomas E. Anderson, and Susan L. Graham, Efficient software-based fault isolation, ACM SIGOPS Operating Systems Review, 27(5): 203-216, Dec. 1993.

Necula et al. "Proof-carrying code," School of computer science, Carnegie Mello University, Nov. 1996, 62 pages.

European Search Report issued in European Application No. 09743550.7 dated Feb. 7, 2014, 8 pages.

International Search Report and Written Opinion in International Application No. PCT/US2009/042965, dated Jul. 30, 2009, 12 pages.

International Search Report and Written Opinion in International Application No. PCT/US2009/042962, dated Dec. 30, 2009, 7 pages.

"Foundational proof-carrying code"; Andrew W. Appel; 10 pages, 16th Annual IEEE Symposium on Logic in computer science; 2001.

"ARM Discloses Technical Details of The Next Version of The ARM Architecture" (Press release). ARM Holdings. Oct. 27, 2011.

"Proof-carrying code, design and implementation", Necula et al; School of computer science; UC berkeley; p. 261-288 2002; 28 pages.

Australian Office Action issued in Australian Application No. 2009271181 dated Jan. 15, 2014, 3 pages.

Authorized Officer Ji Myong Nho, International Search Report and Written Opinion dated Jan. 26, 2010 for International Application No. PCT/US2009/049679, filed Jul. 6, 2009. 8 Pages.

Authorized Officer Nora Lindner, International Preliminary Report on Patentability dated Jan. 18, 2011 for International Application No. PCT/US2009/049679.

Canadian Office Action issued in Canadian Application No. 2,730,128 dated Apr. 30, 2014, 5 pages.

Canadian Office Action issued in Canadian Application No. 2,730,128 dated Apr. 7, 2015, 8 pages.

Chinese Office Action issued in Chinese Application No. 200980127703.8 dated Jan. 13, 2014, 21 pages (with English translation).

Chinese Office Action issued in Chinese Application No. 200980127703.8 dated Jan. 20, 2015, 17 pages (with English translation).

Erlingsson et al. XFI: Software Guards for System Address Spaces. OSDI '06: 7th USENIX Symposium on Operation Systems Design and Implementation. USENIX Association. Seattle, WA, Nov. 2006. pp. 75-88.

Excelsior LLC, Excelsior JET for Microsoft Windows version 6.0 User's Guide, 2007, http://www.excelsior-usa.com/download/jet60x/jet-600-doc-w-in32-pdg.zip, See pp. 5-6, and 99-105.

Franz et al., "Slim Binaries", Communications of the ACM, 40 No. 12, Dec. 1, 1997, pp. 87-94.

Goldberg, Ian et al. A Secure Environment for Untrusted Helper Applications, Jul. 22, 1996, Retrieved from the internet: http://www.cs.berkelev.edu/daw/papers/janus--usenix96.ps. Retrieved Apr. 19, 2006. 13 pages.

(56) References Cited

OTHER PUBLICATIONS

Holzammer, Andreas. Security Issues about Web Browser Add-ons, Jun. 6, 2008, Retrieved from the internet: https://www.net.t-labs.tu-berlin.de/teaching/ss08/IS _seminar/PDF/A.1.pdf. Retrieved Jun. 19, 2012. 10 pages.

Liang, "The Java™ Native Interface Programmer's Guide and Specification", Jan. 1, 1999, 318 pages, Part 1, 145 pages.

Liang, "The Java™ Native Interface Programmer's Guide and Specification", Jan. 1, 1999, 318 pages, Part 2, 173 pages.

Notice of Allowance issued in U.S. Appl. No. 12/266,602 dated Jul. 2, 2015, 13 pages.

Office Action for European Patent Application No. 09798562.6, dated Nov. 22, 2018. 8 pages.

Office Action issued in Canadian Application No. 2,730,128 dated Apr. 11, 2016, 12 pages.

Office Action issued in Chinese Application No. 201510689339.1, dated Apr. 23, 2018, 7 pages (with English translation).

Office Action issued in Chinese Application No. 201510689339.1, dated Aug. 14, 2017, 15 pages (English Translation).

Office Action issued in European Application No. 09798562.6, dated Jan. 25, 2018, 12 pages.

Office Action issued in Korean Application No. 10-2011-7000770 dated Sep. 18, 2015, 9 pages (with English translation).

Office Action issued in U.S. Appl. No. 12/266,602 dated Apr. 15, 2015, 51 pages.

Office Action issued in U.S. Appl. No. 12/266,602 dated Aug. 17, 2012, 40 pages.

Office Action issued in U.S. Appl. No. 12/266,602 dated Dec. 2, 2010, 37 pages.

Office Action issued in U.S. Appl. No. 12/266,602 dated Jun. 25, 2010, 36 pages.

Office Action issued in U.S. Appl. No. 12/266,602 dated Mar. 28, 2012, 36 pages.

Office Action issued in U.S. Appl. No. 12/266,602 dated Nov. 24, 2014, 54 pages.

Schafter, Andreas. Extended European Search Report dated Jul. 3, 2012 for European Application No. 09798562.6, filed Jul. 6, 2009. 7 pages.

Silberschatz, A., et al. Interprocess Communication. Dec. 14, 2004. Operating System Concepts, John Wiley & Sons. Retrieved from the internet: http://proquest.safaribooksonline.com/print?xmlid=9780471694663/int.html . Retrieved Jun. 20, 2012. 8 pages.

Small et al. "MiSFIT: A tool for constructing safe extensible C++ systems," Conference on Object Oriented Technologies and Systems, Jun. 16, 1997, 9 pages.

Stephen, Mark. First Office Action for Canadian Patent Application No. 2,730,128, filed Jul. 6, 2009, dated Apr. 5, 2013. 4 pages.

Wang, Maohua. Translation of the Notification of the first Office Action dated Aug. 22, 2012 for Chinese Patent Application No. 200980127703.8. 7 pages.

Wikipedia, "Fat Binary," Last modified May 25, 2015, [retrieved on May 26, 2015], Retrieved from the Internet< http://en.wikipedia.org/wiki/Fat_binary>, 5 pages.

U.S. Appl. No. 15/172,879, filed Jun. 3, 2016.

U.S. Appl. No. 14/463,345, filed Aug. 19, 2014.

U.S. Appl. No. 12/117,634, filed May 8, 2008.

* cited by examiner

NATIVE CODE MODULE
PSEUDO CALL
INSTRUCTION
300

```
andl R, TSAFETY_MASK
orl R, TEXT_BASE
call *R
```

NATIVE CODE MODULE
PSEUDO JUMP
INSTRUCTION
302

```
andl R, TSAFETY_MASK
orl R, TEXT_BASE
jmp *R
```

EXEMPLARY PSEUDO
CALL INSTRUCTION
WITH MASK VALUES
304

```
andl R, 0x000fffe0
orl R, 0x00100000
call *R
```

METHOD FOR VALIDATING AN UNTRUSTED NATIVE CODE MODULE

RELATED APPLICATION

This application is a continuation of U.S. application Ser. No. 15/172,879, entitled "Method for Validating an Untrusted Native Code Module," filed on Jun. 3, 2016, which is a continuation of U.S. application Ser. No. 14/463,345, entitled "Method for Validating an Untrusted Native Code Module," filed on Aug. 19, 2014, which is a continuation of U.S. application Ser. No. 12/117,634, entitled "Method for Validating an Untrusted Native Code Module," filed on May 8, 2008, the entire contents of which are hereby incorporated by reference.

BACKGROUND

Field of the Invention

The present invention generally relates to computer security. More specifically, the present invention relates to methods for validating and safely executing an untrusted native code module on a computing device.

Related Art

Easy access to computers and plentiful network bandwidth have facilitated sharing of information and applications. For instance, a user can easily install and execute an application which is downloaded from a web site or received from a friend as an email attachment. However, installing and executing such applications on a given computing device involves a level of trust. Because such applications are often executed with inadequate security mechanisms, a user must implicitly trust that the application does not include any malicious code. Some applications exploit such blind trust, however, by including "viruses" that can damage or erase information on the computing device, and can replicate themselves to other vulnerable devices on the network.

Some techniques have been developed to mitigate the negative impacts of viruses. For instance, some interpreted languages seek to reduce the risks involved in executing unknown code by limiting the ability of a language to specify unsafe operations. Alternatively, virtual machine execution environments facilitate running guest operating systems on completely virtualized hardware (which executes on actual hardware), thereby isolating untrusted applications to their own virtual machines to reduce security risks. However, code written for such approaches typically has a performance disadvantage in comparison to executing native code.

Hence, what is needed is a method that provides security without the performance limitations of existing techniques.

SUMMARY

One embodiment of the present invention provides a system that validates a native code module to be executed on a computing device. During operation, the system receives the native code module, which is comprised of untrusted native program code expressed using native instructions in the instruction set architecture associated with the computing device. The system validates the native code module to confirm that it will execute safely by: (1) determining that the set of instructions in the native code module do not include any restricted instructions and/or do not access restricted features of the computing device; and (2) determining that the set of instructions in the native code module are aligned along byte boundaries such that a specified set of byte boundaries always contain a valid instruction and a set of control flow instructions in the native code module have valid targets. The system then allows valid (e.g., successfully validated) native code modules to execute, and rejects native code modules that fail validation. By validating the native code module, the system facilitates safely executing the native code module in the secure runtime environment on the computing device, thereby achieving native code performance for untrusted program binaries without significant risk of unwanted side effects.

In some embodiments, the system performs static binary analysis while validating the native code module.

In some embodiments, the instruction set architecture is the x86 instruction set architecture.

In some embodiments, the system downloads and runs the native code module within a web browser. By validating the native code module and executing the native code module in the secure runtime environment (within the web browser), the system isolates the executing native code module from other programs executing on the computing device.

In some embodiments, the native code module is operating-system neutral, and hence can support applications across multiple operating systems that can run on the instruction set architecture of the computing device.

In some embodiments, the system rejects the native code module if: the native code module includes restricted instructions and/or accesses restricted features of the computing device; the set of instructions are not aligned correctly; and/or one or more control instructions in the native code module have invalid targets.

In some embodiments, the system generates the native code module using a compilation process that ensures that the native code module can be successfully validated.

In some embodiments, compiling and/or validating the native code module involves one or more of the following: ensuring that a target for a control flow instruction is within a specified memory segment; ensuring that an instruction in the native code module is properly aligned for an associated control flow instruction; changing an unsafe instruction for the native code module into a safer set of instructions; determining whether a byte sequence in the native code module is supported for a given hardware implementation of the instruction set architecture; and/or disallowing an unsupported byte sequence in the native code module.

Figure 1:
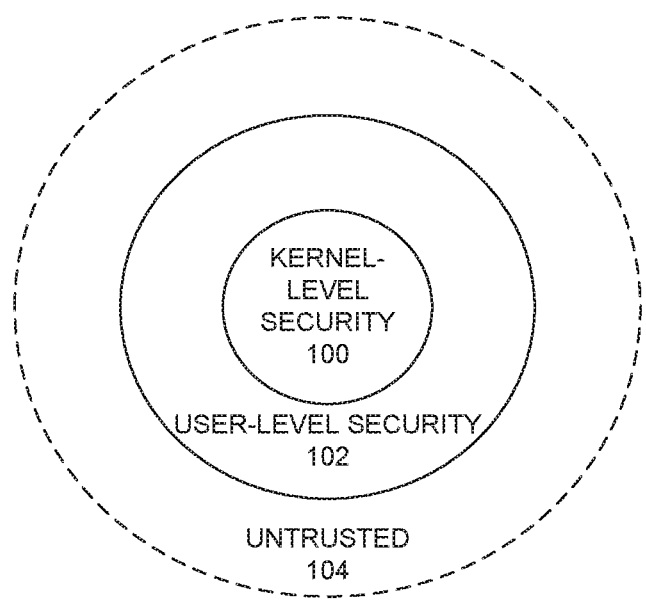
FIG. 1 illustrates a security model for a computing device in accordance with an embodiment of the present invention.

Table 1 illustrates an exemplary function that executes a malicious function call in accordance with an embodiment of the present invention.

Table 2 illustrates an exemplary obfuscated function that executes a malicious function call in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer systems perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Issues in Executing Untrusted Code

Easy access to computers and plentiful network bandwidth have facilitated the sharing of information and applications. This has created numerous situations where it is desirable to be able to safely execute programs that originate from unknown sources and may not be fully trusted. For instance, a user may seek to:

open an executable file received as an email attachment;

open a web page that requests to execute code in the form of a Microsoft ActiveX® control (ActiveX® is a registered trademark of the Microsoft Corporation);

open a web page containing an Adobe® Flash® application (Adobe Flash® is a trademark of Adobe Systems Incorporated);

access a range of web-based application front-ends, such as email or document composition tools, that are implemented using a scripting language such as JavaScript™ (JavaScript™ is a trademark of Sun Microsystems Inc.); or access applications provided by web application hosting services.

Because many users take inadequate security precautions and/or employ inadequate technical measures to assure security, executing such untrusted applications can cause malicious code to be executed. For instance, an untrusted application that is installed and executed on a computing device may perform malicious and/or destructive actions, such as executing a system call that deletes user files (as illustrated in Table 1 by the function DoEvil) or finding and distributing sensitive user information stored on the computing device.

TABLE 1

```
void DoEvil( )   {
    char *eargv[ ] = {"/bin/rm", "-rf", "/home/*", NULL};
    int rc = execve(eargv[0], eargv, NULL);
}
```

FIG. 1 illustrates an exemplary security model for a computing device. Many systems provide (or use) only two layers of security: (1) kernel-level security 100, which attempts to shield basic operating-system functionality from user and/or external actions; and (2) user-level security 102, which enables users to perform a certain set of operations without affecting each other. Note that user-level security typically allows interactions between applications invoked by the same user. Although such systems protect users from each other, a user can install applications and/or perform actions that adversely affect that user's own account and data. Hence, installing and executing untrusted programs can endanger a user's domain, and such programs can potentially exploit known loopholes to compromise kernel-level security. Hence, what is needed is a third level of security 104 that supports the execution of, but also limits the effects of, untrusted programs.

A number of techniques for executing untrusted programs attempt to balance trade-offs in programmability, safety, portability, and performance. For instance, such techniques include:

Unprotected native execution: Trust can be established via non-technical means, thereby allowing a program to execute with limited or no protection. For instance, a user may download and run an arbitrary executable file over the Internet from a trusted application provider. Alternatively, Microsoft ActiveX™ controls allow executable content to be loaded and executed by a web browser, similarly relying on non-technical trust relationships (e.g., by presenting the user with a query window asking "This website has attempted to load an ActiveX program. Would you like to allow this program to execute?") rather than technology-based solutions for protection. Because establishing trust is generally difficult, this option is generally considered an inadequate solution. Breakdowns in such trust relationships, along with malicious deception and exploitation of such relationships, can result in the proliferation of computer viruses and other problems.

Safe languages and execution environments: Some attempts to improve the security of the executable content use interpreted languages with associated execution environments. Interpreted languages can reduce undesirable (or malicious) side effects by limiting the ability of code to perform a set of operations deemed to be unsafe at the language level. Such languages may also be supported across multiple operating systems and/or computing platforms, thereby providing portability benefits when compared to applications that directly execute native instructions (or "native code") on the hardware of a given computing device. For instance, untrusted programs can be written in languages that have been restricted (e.g., JavaScript™, Java™ (Java™ is a trademark of Sun Microsystems), or C# and other languages supported by the Microsoft Common Language Runtime (CLR)) to only be able to express "safe" programs. Although such languages can improve security (as compared to unprotected execution of native instructions), such interpreted languages perform much more poorly than native binary code. For example, while the Java™ language (which executes on a Java™ Virtual Machine) can constrain programs to be safe, the Java™ execution environment has a significant performance overhead and requires substantial installation space. Furthermore, multiple competing security techniques can create user confusion and split developer effort.

Virtual machine environments: Virtual machine execution environments (e.g., VMware™ (VMware™ is a trademark of VMware, Inc.)) can execute untrusted applications in an isolated environment (e.g., on a virtualized machine running a guest operating system), thereby making unintended (or malicious) access to protected resources impossible, which reduces security risks. While sometimes effective, such techniques are still limited by performance overhead, installation overhead, and cost. For instance, instantiating a new operating system kernel within a virtual machine can involve substantial overhead, and may not be practical for flexibly downloading code to be executed in a web browser. Furthermore, untrusted code executed in such an environment cannot flexibly share resources with or otherwise interoperate with other software or hardware entities on the computing device.

Note that simply analyzing native code prior to execution is insufficient to detect many types of malicious operations. For instance, while an analysis tool might detect the malicious code illustrated in Table 1, such code can be re-written in a form that still executes the malicious system call, but which has been obfuscated to no longer appear malicious during such analysis. This is illustrated by the function TrustMe in Table 2, which is targeted for the MacOS™ operating system (MacOS™ is a trademark of Apple Inc). In the specific case of the TrustMe function, this exploit is somewhat specific to architectures with variable instruction lengths (such as the x86 architecture), but detecting subtle and/or obfuscated attacks is difficult in general. Unfortunately, techniques that can reliably detect any malicious instructions in program code are beyond the limit of present computing techniques, if not impossible.

TABLE 2

```
int TrustMe(int returnaddr1, const char *path,
        char *const argv[ ], char *const envp[ ]) {
    int immx = 0x0000340f;
    int codeaddr = 14 + (int)TrustMe;
    asm("mov $59, %eax");    // set syscall # for execve
    asm("add $32, %esp");    // pop local storage
    asm("mov %esp, %ecx");   // kernel wants esp in ecx
    asm("jmp *-20(%ecx)");   // jump to overlapped instruction
                             // via address in local codeaddr
}
#define NULL 0
char *const eargv[ ] = {
    "/bin/rm", "-rf", "/home/*", NULL};
int main(int argc, char *argv[ ]) {
    TrustMe(-1, eargv[0], eargv, NULL);
}
```

In summary, existing techniques for executing untrusted program code typically sacrifice some aspects of programmability, safety, operating system portability, and/or performance. One embodiment of the present invention facilitates executing an untrusted native code module safely and securely on a substantially similar set of hardware. This embodiment protects the host process and the rest of the host device from malicious behavior by the untrusted module while providing performance which is substantially similar to native code performance.

System Overview

One embodiment of the present invention provides a system that safely runs untrusted native code on a computing device with performance substantially similar to trusted native code. In doing so, the system verifies that untrusted native code has data integrity, control flow integrity, and has been written in a restricted ("safe") subset of the instruction set for the computing device. These properties are enabled for the native code module at compile time, and are then validated when the system loads the module into a secure runtime environment. During execution, this secure runtime environment provides moderated access to system resources, and restricts module resource accesses as specified by a security policy (which may be determined by and/or associated with an organization, a computing device, an application, a user, and/or some other entity). The untrusted module can only access common system resources (e.g., communications with other local processes, durable storage, etc.) via the secure runtime environment. Note that while the native code module is executed in a secure runtime environment, the instructions in a validated native code module run directly on the hardware of the computing device itself, and do not involve emulation, virtualization, or interpretation.

Figure 2:
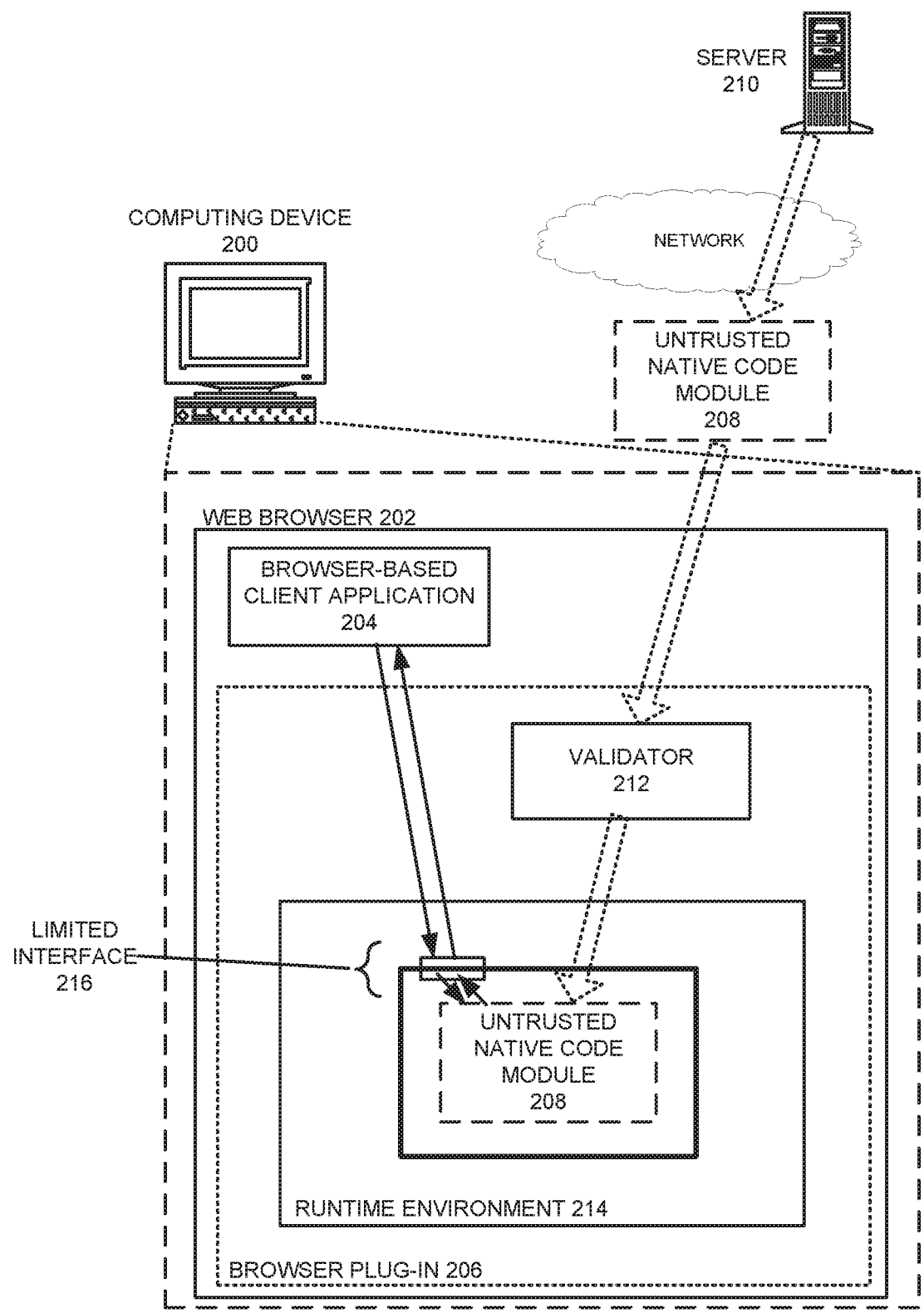
FIG. 2 illustrates the execution of an untrusted native code module in accordance with an embodiment of the present invention.

FIG. 2 illustrates the execution of an untrusted native code module in one embodiment of the present invention. During operation, a user performing operations in web browser 202 on computing device 200 accesses a web page, and invokes browser-based client application 204. Browser-based client application 204 causes browser plug-in 206 to download untrusted native code module 208 from network server 210. Note that untrusted native code module 208 is validated by validator 212 as it is loaded into secure runtime environment 214. If validator 212 determines that untrusted native code module 208 is not compliant with a set of validation rules, the module is rejected (and hence not executed). Otherwise, if untrusted native code module 208 passes validation, it can be safely executed in secure runtime environment 214.

During execution, secure runtime environment 214 provides a very limited interface 216 between the untrusted native code module 208 and other software entities and hardware resources, moderating all external requests made by untrusted native code module 208 (as well as the way in which these requests are made).

The system illustrated in FIG. 2 executes untrusted native code modules in a web browser, thereby allowing untrusted native code to be safely run as an alternative (or complement) to a JavaScript™ front-end for a performance-sensitive web-based application (e.g., a game with compute-intensive physics modeling). In this scenario, the system can close the performance and functionality gap between web-based applications and 'native' or 'console' applications, thereby enabling enhanced web-based applications with less risk of viruses, worms, spyware, and other related software security defects. Note, however, that the described techniques are not limited to web browsers, and can be used anywhere that native-code performance and an additional level of security are needed for all or part of an untrusted application. For instance, the described techniques can be used to: execute and/or extend untrusted stand-alone applications; allow user enhancement of specialized environments such as game consoles, where allowing users to extend application functionality in a protected (but high-performance) manner may be desirable; safely execute email attachments; and enhance scripting environments by safely using native code to speed up critical and/or compute-intensive code sections.

In one embodiment of the present invention, the system allows safe execution of an untrusted x86 binary code module on a computing device, thereby enabling the module to serve as an application component that achieves native performance but is structurally immune from security problems such as viruses. Such binary modules are operating-system independent, and hence are portable across various x86 operating systems. Note that the binary code module can be implemented using a range of popular programming languages (such as C or C++), unlike other environments that limit language choice. Also, note that although the following description the system uses the Intel x86 processor architecture, the techniques described in the instant application are not limited to this architecture, and can be applied to a wide range of processor and/or hardware architectures (e.g., the PowerPC and ARM architectures).

In one embodiment of the present invention, the system provides the following benefits:

Protection: Untrusted modules cannot have unwanted side effects on a host process or any other part of the system, including other untrusted modules. Furthermore, untrusted modules cannot communicate directly with the network. The system prevents untrusted modules from making unmediated system calls, thereby preventing such untrusted modules from using such system calls to exploit system vulnerabilities by directly creating or modifying files in the file system, starting processes, engaging in clandestine network communications, etc. The untrusted module relies entirely on the secure runtime environment for access to system services, with the secure runtime environment taking full responsibility for the safety of the services provided.

Privacy: The system ensures that untrusted modules cannot read or write data to which they have not been explicitly granted access.

Operating System Portability: The system allows untrusted modules to be executed on any operating system that supports the secure runtime environment (e.g., for the x86 architecture, untrusted modules could be supported in the Windows™, MacOS™, and Linux™ operating systems (Windows™ is a trademark of the Microsoft Corporation, and Linux™ is a trademark of the Linux Mark Institute).

Multi-threading: Untrusted modules may be multi-threaded.

System Implementation and Performance: The system is optimized to need only a small trusted code base, thereby facilitating portability, security audits, and validation. The system provides performance for compute-intensive modules that is comparable to unprotected native code performance while achieving a comparable level of safety to virtual machine and language-based approaches.

Ease of Module Implementation: External developers can easily write and debug modules to be executed in the system using familiar tools and programming techniques.

Note that the described system simultaneously addresses both performance and portability issues while eliminating security risks, thereby allowing developers to use portable, untrusted native-code modules in their applications without requiring application users to risk the security of their devices and/or data.

In one embodiment of the present invention, the system includes: a modified compilation chain that includes a modified compiler, assembler, and linker that are used to generate safe, compliant executable program binaries; a loader/validator that loads the module into memory and confirms that the untrusted module is compliant with a set of code- and control-flow integrity requirements; and a runtime environment that provides data integrity and moderates both the module's ability to access resources and how the module accesses such resources. The compilation and validation processes ensure that unwanted side effects and communications are disabled for the untrusted module, while the secure runtime environment provides a moderated facility through which a limited set of desirable communications and resource accesses can safely occur. These components are described in more detail in the following sections.

Native Code Module Compilation and Validation

In one embodiment of the present invention, complementary compilation and validation processes ensure that only safe native code modules are created and loaded into the system. The compilation process involves using a compiler, an assembler, and a linker which work together to generate a system-compliant binary native code module. The validator loads this native code module into memory, and confirms that the native code module is indeed system-compliant. Note that validating the compiled module at load time (as the last action prior to execution) allows the system to use (but not trust) the output of the compiler. Such validation can also detect any malicious actions that attempt to compromise the safety of the native code module between compilation and execution.

Note that the system can use a combination of compiler-based techniques and static binary analysis (e.g., analysis of assembly code during validation) to achieve safety with lower execution overhead than dynamically analyzing and rewriting executable code at runtime (as is commonly done in some virtual machine environments). Additionally, static binary analysis facilitates implementing the validator and runtime environment in a small trusted code base, thereby facilitating security verification for the code base and reducing the likelihood of bugs and/or vulnerabilities. In some embodiments, however, the system may also use dynamic analysis and code-rewriting techniques.

In one embodiment of the present invention, creating a system-compliant native code module involves following a set of restrictions and/or policies that preserve the integrity and security of code, control flow, and data. Preserving code integrity involves ensuring that only "safe" instructions can be executed by the native code module, and that no unsafe instructions can be inserted at runtime via dynamic code generation or self-modifying code. Restricting the instruction set which is available to the native code module also can help to make decoding the native code module (during validation) more reliable. Preserving control flow integrity involves ensuring that control flow instructions in the native code module cannot violate security by calling instructions outside of the native code module. Preserving data integrity involves ensuring that a native code module cannot perform "wild reads" or "wild writes" (e.g., reads or writes outside of a specified data region associated with the native code module).

In one embodiment of the present invention, the validator helps to achieve code, control-flow, and data integrity for an x86 native code module in part by ensuring that a set of "unsafe" instructions from the x86 ISA (instruction set architecture) are not included in a native code module. For instance, the validator may disallow the use of the following instructions and/or features in a native code module:

the syscall (system call) and int (interrupt) instructions, which attempt to directly invoke the operating system;

all instructions that modify x86 segment state (including LDS, far calls, etc), because these instructions interfere with the memory segments that are used to enforce data integrity (see the segmented memory description below);

the rdtsc (read time stamp counter) and rdmsr (read from model specific register) instructions, as well as other hardware performance instructions and/or features which may be used by a native code module to mount side-channel attacks (e.g., by covertly leaking sensitive information);

various complex addressing modes that complicate the verification of control flow integrity;

the ret (return) instruction, which determines a return address from a stack location, and is replaced with a sequence of instructions that use a register-specified destination instead (and hence is not vulnerable to a race condition that allows the stack location to be used as a destination by a first thread to be overwritten maliciously (or erroneously) by a second thread just prior to the execution of the return instruction); and some aspects of exception and signal functionality—for instance, while the system may support C++ exceptions (as defined in the C++ language specification), the system may not support hardware exceptions (such as divide-by-zero or invalid memory reference exceptions) due to operating system limitations, and may terminate execution of an untrusted native code module when faced with such a hardware exception.

Furthermore, to provide effective code discovery and control integrity, the system also restricts a set of control transfer instructions. Specifically, unmodified indirect control flow instructions that can transfer execution to arbitrary locations in memory need to be modified to guarantee that all indirect control flow targets are in memory regions that are valid for the native code module. One embodiment of the present invention limits indirect control flow instructions by: (1) not allowing return, far call, and far jump instructions, (2) ensuring that call and jump (jmp) instructions only use relative addressing and are encoded in a sequence of instructions such that the control flow remains within the native code module; (3) ensuring that register indirect call and jump instructions are encoded in a sequence of instructions such that the control flow remains within the native code module and targets valid instruction addresses within the module; and (4) not allowing other indirect calls and jumps.

Figures 3A, 3B:
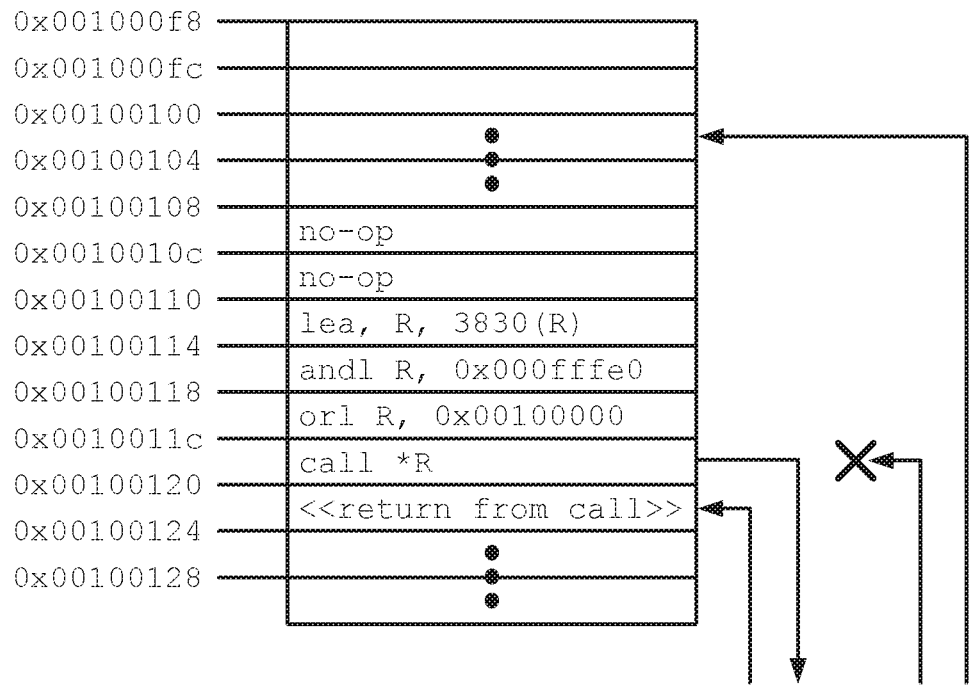
FIG. 3A illustrates several exemplary sequences of instructions that ensure that control flow remains within a given native code module in accordance with an embodiment of the present invention.
FIG. 3B illustrates a memory region that is aligned to 32-byte boundaries and contains a pseudo instruction in accordance with an embodiment of the present invention.

FIG. 3A illustrates several exemplary sequences of instructions that ensure that control flow remains within a given native code module. For instance, the compiler can use a pseudo call instruction 300 in native modules that performs a logical "and" (andl) and a logical "or" (orl) instruction upon the destination address (in register R) prior to the call to ensure that the destination address is masked to be within the bounds of a memory segment for the native module code. A substantially similar pseudo jump instruction 302 incorporates substantially similar logical masking operations. Note that the actual immediate values in pseudo call instruction 300 and pseudo jump instruction 302 include two parameters (TSAFETY_MASK and TEXT_BASE) that need to be filled in. Note that these parameters can only be filled with actual masking values at the time that the system knows the code text size and memory location. For instance, the immediate values used in pseudo instructions for a given native code module may be written by the linker at link time or by the validator during the validation process. An exemplary pseudo call instruction with mask values 304 illustrates a set of values that limit the call target to a 32-byte aligned target (as specified by the 'e0' lower bits in the andl instruction) in a one megabyte code section (as specified by the 'fffe' activated bits in the andl instruction), and then offsets the base address to a specific memory region (that begins at memory address '0x00100000', as specified in the orl instruction) associated with the code for the native code module.

To ensure control flow integrity, some embodiments of the present invention limit the set of instructions that can be control flow targets. For instance, for the above pseudo instructions, the system ensures that the logical instructions in the pseudo instruction are executed before the jump or call instruction. Without this guarantee, another set of instructions could set register R to a desired target address and then branch (or otherwise change the control flow) directly to the specified call or jump instruction, thereby bypassing the masking instructions (and potentially violating control flow integrity). In some embodiments, the system ensures that indirect jumps and calls can only target a limited set of addresses. For example, the system may only allow 32-byte boundaries to serve as control flow targets, and then ensures that the instructions in the native code module are aligned such that all control flow targets are aligned along 32-byte boundaries to conform to this requirement. For instance, the system can achieve the desired alignment during the compilation process (e.g., by inserting no-op instructions where needed), when the set of control flow targets is typically known (e.g., such targets often include functions, labels, returns from functions, and other known targets), and then re-confirm that the native code module is properly aligned in the validator. Note that the granularity of target alignment in the system may be adjusted based on a number of factors, such as the maximum instruction size for a given architecture and the largest set of consecutive, un-targetable instructions needed. For instance, for the x86 architecture, the system might align targets along 16-byte, 32-byte, 64-byte, or other power-of-2 boundaries to simplify masking. Alignment granularity may also be determined based on estimates of associated overheads. Note that a larger alignment granularity may lead to undesirable increases in code size due to increased no-op padding.

FIG. 3B illustrates a memory region that is aligned to 32-byte boundaries and contains a pseudo instruction. In this example, because indirect jumps and calls can transfer to any aligned 32-byte address, no instruction (including the sub-instructions of the pseudo instructions) is allowed to overlap a 0mod32 boundary (e.g., memory addresses 0x00100120 or 0x00100100, both of which can serve as branch targets, unlike the call instruction at memory address 0x0010011c). Note also that the call instruction (at memory address 0x0010011c) needs to be aligned such that the following address is a valid target, so that the jump instruction that returns from the function called can return to the calling point.

In some embodiments of the present invention, the system uses hardware-based segmented memory protection to facilitate data and control flow integrity. Memory segments are a common mechanism for implementing memory protection that is supported on such systems as the IBM 360, CDC 6600 and on Intel 80286-compatible systems (e.g., on most x86-based systems). Memory segments can be manipulated using a set of instructions and registers that establish a base address and bounds for a given memory segment, with the hardware ensuring that memory accesses during segmented operation are limited to addresses between the base address and the bounds of the memory segment. For instance, for the x86 architecture, the system can set values in the segment registers to control the range of data accesses as well as how the instruction pointer is interpreted for the code segment (e.g., using the code segment (CS) register) to ensure that: (1) data accesses are limited to a specific data segment for the native code module, thereby ensuring data integrity; and (2) the code text region for each native code module starts at an address of zero. After setting up segment state (e.g., setting up a set of segment control registers appropriately), and ensuring that untrusted code cannot change this segment state, native code modules can be allowed to use the same data reference instructions used by any other programs, but with the hardware actively ensuring that code instructions and data references are sandboxed. Hence, the system can use hardware-supported segmented memory (such as the segmented memory support in the x86 architecture) to provide "hardware fault isolation." Such hardware fault isolation eliminates the need to use special sandboxing sequences for data references, thereby helping improve performance and making it easier to adapt compilers to generate native code modules. Note, however, that in some embodiments where hardware support for memory segments may not be available or accessible the system may need to fall back to data reference sandboxing techniques that instead ensure data integrity via software fault isolation (with, most likely, an additional performance overhead).

In some embodiments of the present invention, the use of hardware to provide segmented memory support for native code modules simplifies the masking operations needed for the above-described pseudo instructions. Because the system can use hardware-based segmented memory support to base the code text of the native code module at address zero (0x00000000), no base memory offset is needed, and the system can eliminate the orl instruction from the pseudo instructions. Furthermore, because the execution of out-of-bounds instructions is now prevented by the segmented memory support, the system no longer needs to mask the higher-order bits of the andl instruction. For instruction sets with variable-size instructions (such as the x86 architecture), this may allow the pseudo instructions to use a simpler (and smaller) and instruction.

Figure 3C:
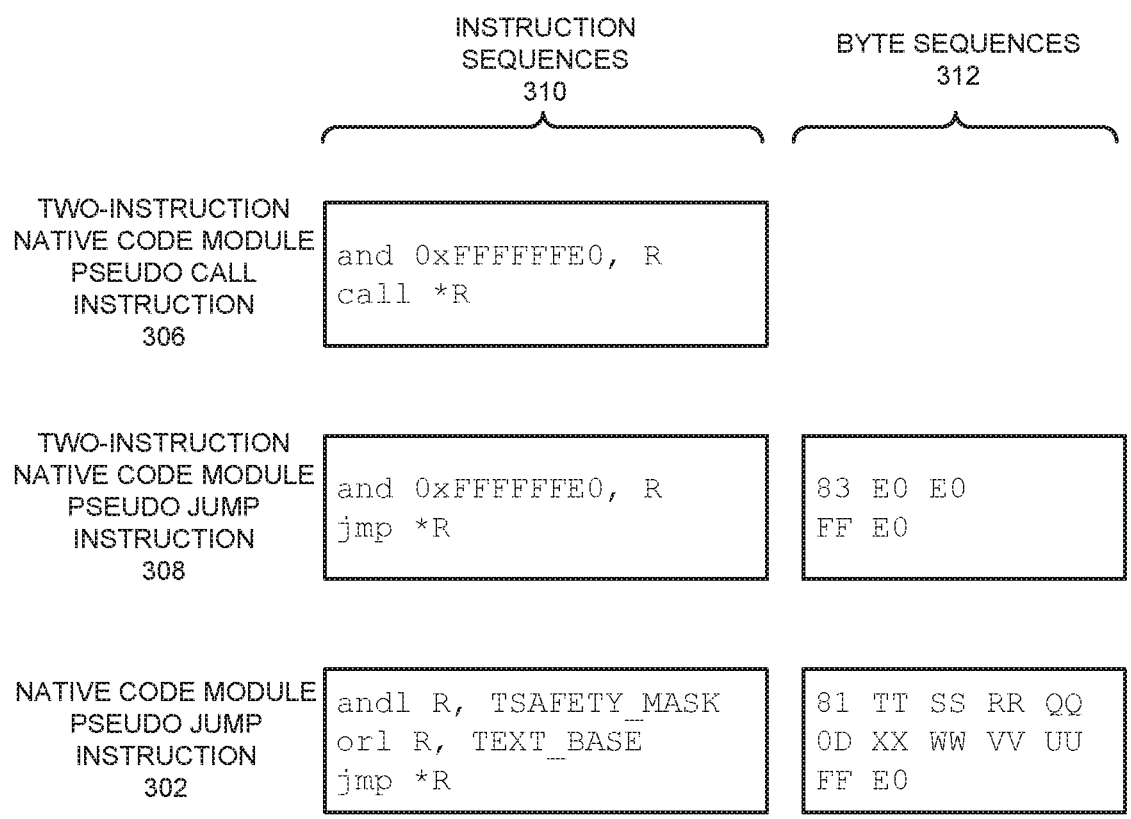
FIG. 3C illustrates reduced-size pseudo instructions that can be used in conjunction with hardware segmented memory support in accordance with an embodiment of the present invention.

FIG. 3C illustrates reduced-size pseudo instructions that can be used in conjunction with hardware segmented memory support. The two-instruction pseudo call 306 and jump 308 instructions that can be used in native code modules now only need an additional and instruction that ensures that the control flow target is aligned (e.g., in this case to 32-byte boundaries, as specified by the 0xE0 value, which is logically expanded to 0xFFFFFFE0 by the hardware during execution of the logical "and" instruction). FIG. 3C displays both exemplary instruction sequences 310 for the two-instruction pseudo instructions as well as exemplary x86 byte sequences 312 (including x86 instruction opcodes and immediate values) for the two versions of pseudo jump instructions (308 and 302). The two-instruction pseudo jump instruction 308 uses only five bytes (note that the processor sign-extends the value 0xE0 to 0xFFFFFFE0, thereby allowing the use of a two-byte and instruction), while the byte sequence 312 for the previous pseudo jump instruction 302 displayed in FIG. 3A may use 12-14 bytes (depending on the specific instruction and registers used), where 0xqqrrsstt is a four-byte constant representing the next power of two larger than the text segment size minus the alignment, and 0xuuvvwwxx is the text segment's load address. Note that reducing the byte size of the pseudo instruction sequences can reduce code size increases associated with the above-described techniques.

In one embodiment of the present invention, the system invokes a loader (which can be incorporated into the validator, or exist as a separate component) upon receiving an untrusted native code module. The loader reads the executable content and supporting data for the module and loads the module into memory, minding factors such as alignment restrictions and relative position. (Note that if hardware-supported memory segments are not supported, or shared libraries are used, the loader at this point may need to traverse relocation records associated with the module to update addresses based on the actual load address for the various segments of the module). Note that such loading functions are comparable to those commonly used by an operating system (e.g., by the exec ( ) system call in UNIX® (UNIX® is a registered trademark of The Open Group)). The loader may also edit some of the code sequences in the native code module to enable runtime enforcement of control-flow integrity. After the module has been loaded and relocations have been applied, the system can validate the executable content.

Figure 4:
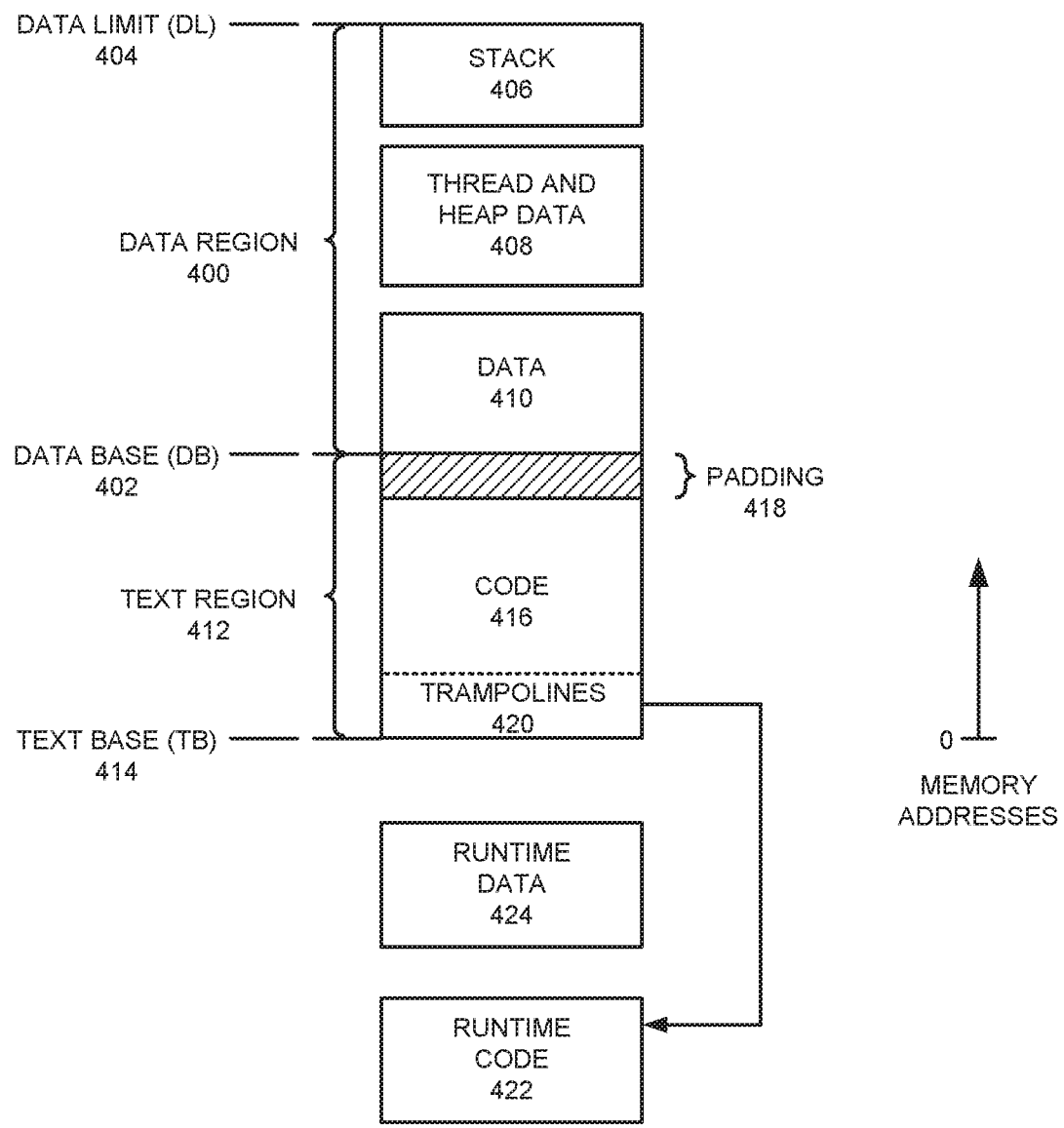
FIG. 4 illustrates the layout of a native code module that has been loaded into a memory segment in accordance with an embodiment of the present invention.

FIG. 4 illustrates the layout of a native code module that has been loaded into a memory segment. As described above, the system can guarantee data integrity by setting up segment state such that the untrusted native code module is only allowed to perform data access on a data region 400 (e.g., using x86 segment registers). The native code module's data region 400 stretches from data base address (DB) 402 to data limit address (DL) 404, and allocates space for the stacks 406 of each thread (in the native code module), data for threads and an application-managed heap 408, and data space 410 for global variables. A read-only code text region 412 for the native code module stretches from text base (TB) address 414 to the text limit address (TL), which is equal to DB 402. Note that code text region 412 may be padded 418 beyond the actual size of code 416 (e.g., using one-byte no-op (nop) and/or one-byte halt (hlt) instructions) so that the size of text region 412 is an even power of two (e.g., to simplify the masking of control flow operations). To facilitate implementation, the code text region 412 may also be statically linked at a start address of zero (e.g., providing a zero-based address range for the native code module). The validator checks that instructions in code 416 can only refer to data in data region 400. Note, however, that code instructions can arbitrarily read or write any location within the data region, and the validator and runtime environment may not enforce type-safety or more fine-grained bounds restrictions. Note also that while the runtime system may read the native code module's data, it needs to be very careful not to trust this data in any way that can affect system security. In particular, the validator and runtime environment guarantee that the native code module will be safe, but do not guarantee that any operations performed or values generated by the native code module are "correct" (e.g., correctly perform the actions or generate the values intended by the programmer and/or desired by the user).

To ensure control integrity and data integrity, the system only allows instructions in the code 416 to transfer control to valid instructions in the text region 412. As mentioned previously, the system prevents jumps into the middle of an instruction or the middle of a critical instruction sequence by statically checking direct control flow transfers and ensuring that indirect control transfers can only transfer control to aligned targets (via no-op padding). However, the native code module needs to have some way to communicate results to external clients and, as allowed, make requests to the runtime system. In one embodiment of the present invention, the system provides a constrained system call interface that can only be accessed via a set of "trampoline instructions" (or "trampolines") 420 found in text region 412. These trampoline instructions 420 include a limited set of safe (and aligned) entry points into the runtime system that are initialized by the loader/validator with trusted code that can transfer control to trusted runtime code and/or services 422. These trampoline instructions 420 are the only mechanism that can be used to transfer control flow in and out of the untrusted native code module. Because these trampoline instructions 420 are trusted instructions that are generated by the secure runtime environment, they can include instructions that would otherwise be illegal in an untrusted native code module. For instance, a set of trampoline instructions generated and inserted into the lowest portion of text region 412 may be used to transfer control to other trusted routines in the secure runtime environment, or send or receive messages to the client runtime or other services. Note that when the system uses hardware-supported memory segments, trampoline instructions 420 can be used to disable segmenting and return the system to (trusted) flat addressing for the execution of trusted code. Similarly, when the trusted code returns control to the native code module, the secure runtime environment can transfer control flow to a set of trampoline instructions 420 that re-establish the segmented memory support (and thereby re-enable data, code, and control flow integrity). A set of trampoline instructions may be customized in a granular manner for specific native code modules, with the secure runtime environment only generating trampoline instructions for the set of accesses allowed for the given native code module. Note that the trampoline instructions are not constrained to the lowest portion (e.g., lowest 8 Kbytes) of text region 412, and can be located anywhere in text region 412. Note also that the system may maintain a separate, secure data region 424 that stores data related to the runtime and/or other services (e.g., to store browser internal state, file buffers, etc.).

In one embodiment of the present invention, the validator performs a binary static analysis that confirms that an untrusted native code module conforms to the set of security constraints described above. The validator scans through the code section of each native code module that is loaded, decoding all executable instructions using a sequential traversal of the instruction stream that starts at the load (base) address. As described above, the validator rejects a native code module if it finds any defects, such as: illegal/disallowed instructions; alignment defects; direct branches with an invalid branch target; and/or unsafe indirect calls or jumps (that do not follow the target range and alignment restrictions described above). Note that the validator does not need to fully disassemble the code (e.g., fully resolve the operands of instructions or reduce the set of instructions to a human-readable form), but instead can decode the opcodes and lengths of the instructions in the instruction stream. During the decoding traversal, the validator builds and maintains two tables: a table of valid control-flow targets (VTT); and a table of known control-flow targets (KTT). Each valid (aligned) instruction that is encountered in the read-only code segment during the traversal is marked as valid in the VTT, and all unmarked instructions are considered invalid (for alignment purposes). During traversal the validator also recognizes all control-flow instructions, and notes the destination address of static targets in the KTT. For instructions with a target computed at run-time, the validator confirms that the instruction is part of a multi-instruction sequence with the appropriate mask values set by the loader, and marks intermediate instructions in the multi-instruction sequence as invalid in the VTT. After decoding the code text segment (which may include multiple sections), the validator traverses the KTT to confirm that each target is marked as valid in the VTT. At this point, the validator detects unsafe situations caused by masking instructions (from a pseudo instruction) that overlap an aligned byte boundary (and were marked as invalid in the VTT during the traversal). The validator also performs an additional check that all indirectly-targetable instructions (e.g., all instructions on the aligned byte boundaries) are included in the VTT (e.g., to ensure that all indirect branch targets are valid). Note that the described static decoding process can be implemented using a relatively small amount of code, which facilitates verification of the security and correctness of the validator. Note also that the code text segment needs to be limited to "pure text," and not include a small set of problematic features and/or structures (such as static data or switch tables) that may be interpreted as bad instructions by the described decoding process. While interlacing read-only data in the instruction stream can provide performance benefits, such data in the code text segment could also add unwanted complexity to the logic that detects byte sequences of unsafe instructions.

Figure 5:
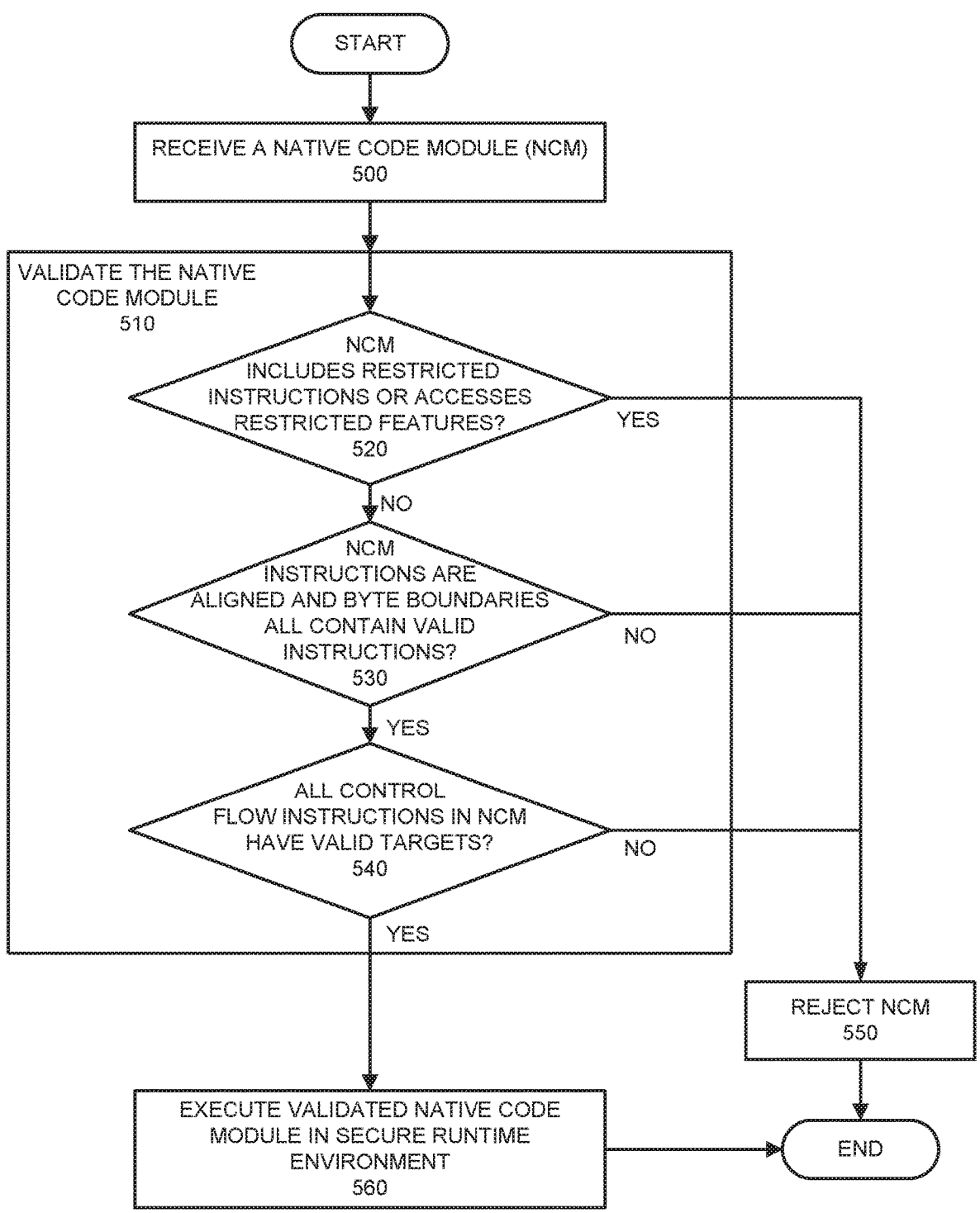
FIG. 5 presents a flow chart illustrating the process of validating an untrusted native code module to be executed on a computing device in accordance with an embodiment of the present invention.

FIG. 5 presents a flow chart illustrating the process of validating an untrusted native code module to be executed on a computing device. During operation, the system receives an untrusted native code module to be executed on a computing device (operation 500). This native code module is comprised of untrusted native program code expressed in the instruction set architecture associated with the computing device. Next, the system validates the native code module to confirm that the module will execute safely (operation 510). In doing so, the system first determines whether the set of instructions in the native code module includes any restricted instructions and/or accesses restricted features of the computing device (operation 520). If so, the system rejects the native code module (operation 550), and the process completes. If not, the system determines whether the set of instructions in the native code module are aligned along byte boundaries such that a specified set of byte boundaries always contain a valid instruction (operation 530). If so, and if all of the control flow instructions in the native code module have valid targets (operation 540), the system proceeds to execute the successfully-validated native code module in a secure runtime environment (operation 560). Otherwise, the system rejects the native code module (operation 550). By validating the native code module, the system facilitates safely executing the native code module in the secure runtime environment on the computing device, thereby achieving performance substantially similar to trusted native code for untrusted program binaries without significant risk of unwanted side effects.

A system-compliant set of compilation tools can assist the validator by generating properly-aligned native code modules that correctly use the indirect call/jump pseudo-instructions, do not include any disallowed instructions, features, and/or instruction sequences, and can be reliably decoded by the validator. Note that the generation of safe executables typically involves making only a small number of relatively local changes to existing compilation tool chains, thereby simplifying the set of modifications needed for vendors seeking to generate executable files that are compatible with and can execute safely in the described system. Specific changes may include: modifying an assembler to add the above-described pseudo-instruction sequences and enforce the alignment of instructions; and modifying a compiler to change generated code sequences to reflect the above-described indirect control flow and perform function- and label-alignment. The requirements checked by the validator do not need to be kept secret, and can be openly published (without compromising security) to enable any party to create a set of compilation tools for the system and/or easily modify existing compilation tools to be able to generate compliant native code modules. Because the system only trusts the validator, and not the compiler, the validator will always confirm that a given compiler's output meets the standards of safe execution and reject any native code modules that are non-compliant and fail the static binary analysis. The outputs of the compilation process can use standard binary formats (e.g., take the form of simplified stand-alone 32-bit x86 ELF relocatable binaries) that can be debugged using conventional debugging tools. Hence, programmers who prefer languages such as C and C++ can continue using languages and compilation tool chains that are substantially similar to what they have been using. Note that highly-tuned, hand-coded assembly sequences and/or compiler intrinsics (e.g., manual micro-architecture optimizations) can also be used for native code modules, as long as they follow the above requirements (e.g., the specified alignment requirements and instruction restrictions).

Note that the described system may not execute pre-existing non-compliant binaries, and may instead require an application to be rebuilt as a compliant native code module using a compliant compilation process. However, in some embodiments the system may support non-compliant binaries using binary translation techniques that achieve the level of security guarantees needed to be approved by the validator. Such binary translation techniques can be used in scenarios where it is desirable to incorporate code from sources that cannot or will not modify their compilation tool chains to support compliant native code modules. Typically, using a compliant compilation tool chain involves less overhead in the software development process for native code modules, because a binary translator may not be perfectly reliable, and may involve some trial and error on the part of developers before generating a module that validates successfully.

Because untrusted native code modules execute natively on the hardware of computing devices, the above-described techniques enable the system to safely achieve performance substantially similar to the performance of trusted native-code execution without sacrificing security. Note that the code size of native code modules may increase due to additional instructions in pseudo-instruction sequences and alignment-related padding. However, because instruction caches have become very large and often work more efficiently when indirect branch targets are aligned, and the number of indirect control flow instructions is typically not large, the effect on performance is also typically limited. Hence, the system provides execution performance which is substantially similar to the performance of unprotected native code, and outperforms other existing approaches (such as interpreted languages and virtual execution environments).

In summary, the compilation process creates a system-compliant native code module that can be validated to confirm that the executable content in the native code module conforms to a set of desired security requirements. Moreover, the described techniques used by the modified compilation tool chain, loader, and validator allow untrusted native code modules that can be executed safely in a secure runtime environment with native-code performance. The secure runtime environment, which provides execution monitoring for the untrusted native code module by moderating interactions between the module and other software or hardware entities, is described in more detail in the following section.

A Secure Runtime Environment

As described above, the compilation and validation processes ensure that native code modules are compliant with system requirements, and hence do not have any unwanted side effects that affect system security. However, while isolating native code modules from all other software and hardware components preserves security, software modules typically do not execute in isolation, and need to communicate results to a client application and/or access system resources. Embodiments of the present invention enable limited communication between the native code module and other system components using a secure runtime environment.

In one embodiment of the present invention, the secure runtime environment:
- provides the ability to load and launch native code modules;
- provides an execution environment for native client modules that includes communications, threads, memory management, and debugging support;
- moderates access to system resources using a simple access policy that ensures that native code modules do not violate system protection and privacy constraints;
- supports multiple native code modules isolated from each other; and
- can be implemented in a small amount of code that can be both easily audited as well as ported to multiple operating systems that run on the same hardware architecture.

The secure runtime environment moderates both which resources can be accessed (and communicated with) by the native code module, as well as how such resources are accessed, thereby ensuring that the native code module relies entirely on the secure runtime environment to access system services and cannot perform sensitive operations without explicit mediation. For instance, a native code module cannot read or change file system state, initiate network (or inter-module and/or inter-process) communications, or launch computations outside of an isolated "sandbox," and instead must rely on the secure runtime environment to perform such interactions (if allowed) on its behalf.

In some embodiments of the present invention, the secure runtime environment includes multiple aspects of runtime functionality. For instance, the secure runtime environment may include:

1. Client runtime functionality that provides an interface that allows client applications to create services based on untrusted native code modules and communicate with such services;
2. Service runtime functionality that serves as an application execution environment that loads and launches native code modules on behalf of clients and provides access to a set of basic system services while ensuring the isolation of intended security domains;
3. IMC (inter-module communication) runtime functionality that provides mechanisms for communications between trusted modules and the service runtime; and
4. Developer runtime functionality that is linked into the untrusted native code modules during development to facilitate communication with other aspects of the secure runtime environment.

1. Client Runtime:

Because a wide range of application types may seek to access the native code performance of native code modules, the client runtime provides a general external interface for interacting with such modules. For instance, the client runtime can: provide facilities for loading and unloading native code modules; present the set of functions supported by a native code module to clients (e.g., exposing a list of external procedure calls available for the native code module); and provide hooks that the client environment can use to call such functions. If the native code module executes in a separate process and/or address space from a client application, the client runtime may also be responsible for marshaling data between the two entities.

In some embodiments of the present invention, the system may involve multiple client runtimes that support different types of clients. For instance, in a browser environment, client runtime functionality to support JavaScript™ may be included in a browser plug-in that allows JavaScript™ applications to load, unload, and invoke functions in native code modules. For example, the plug-in may provide a loadURL function that enables a JavaScript™ application to specify the URL (uniform resource locator) for a desired native client module and receive callback notification that indicates whether or not the load succeeded. Upon a successful load, the client runtime can export a list of invokable functions associated with the module to the JavaScript™ application, along with information about the parameters available for each function. In some embodiments, the client runtime (and native code modules) may support a type descriptor convention that allows parameters and return information to be marshaled between a client application and a native code module in the form of an array of read-only values. (Note that due to security issues, pointers cannot be used to pass parameters and return information between client applications and native code modules).

Note that the functionality provided by the native code module may be used and/or accessed differently, on a per-client-application basis. For instance, functions exported by the native code module may be either blocking or non-blocking, and the entry points into a native code module used by different client applications may vary. For instance, a native code module might only perform computations in response to individual functions called by a client application, or may instead continuously monitor a message dispatch loop that receives input from a shared memory buffer (see below) or some other event management queue.

2. Service Runtime:

In some embodiments of the present invention, the service runtime provides functionality similar to that of an operating system, e.g., loading and launching modules on behalf of the host computation, providing access to a set of basic system services, and ensuring isolation between the separate security domains of client applications and untrusted native code modules. Because native code modules are restricted from directly accessing the native operating system kernel, all communications and system service requests made by native code modules are submitted to the service runtime. This intermediary role enables the service runtime to mediate all communication and access to system resources and enforce an access control policy that is stricter than that of the underlying native operating system.

In one embodiment of the present invention, upon receiving a request from the client runtime to load a native code module, the service runtime:

1. Allocates memory to hold the native code module;
2. Downloads (or loads) the native code module and loads the native code module's text and data into memory;
3. Initializes any needed statically-initialized data and, if needed, updates the constant fields in any masking instructions (as described above for pseudo-instructions);
4. Adds runtime information for the native code module (such as the above-described trampoline instructions, along with correct jump addresses);
5. Runs the validator on the native code module (as described above), (optionally) disabling any invalid instructions detected by the validator;
6. Ensures that the memory pages for the executable code of the native code module are protected and that data integrity mechanisms are active for the data segment of the native code module;
7. Sets up the heap for the native code module; and
8. If specified by the calling client, sets up initial arguments and jumps to an entry point for the native code module.

Note that loading the native code module may also involve performing a set of relocations for the native code module (e.g., as specified in a relocation table for the native code module) if shared libraries or non-zero-based segments are used. Alternatively, if the native code module is compiled to include fixed zero-based addresses, no relocation is needed.

The service runtime is responsible for providing essential system services to native client modules, including memory allocation, thread creation, and communications. The service runtime also provides a system call interface to loaded native code modules, and performs the system calls allowed for each given module on its behalf. As the intermediary, the service runtime is responsible for providing these services while insuring that a malicious native code module cannot cause security problems (e.g., trigger disallowed system calls) or use resources inappropriately. For example, the service runtime ensures that a multi-threaded native code module cannot potentially exploit vulnerabilities due to race conditions in the system call interface. Note that because the service runtime loads untrusted native code modules into memory, and interacts directly with such modules as they execute, bugs in the service runtime can jeopardize the security properties of the entire system. Hence, ensuring the correctness and security of the system runtime, and every interface supported by the system runtime, is a high priority.

In some embodiments of the present invention, the system provides debugging support for native code modules. For instance, the compilation process may provide mechanisms for building and linking a native code module to a different runtime implementation that includes the same interfaces as the secure runtime environment but where the different implementation of the service runtime provides additional debugging support and/or output. Alternatively, the service runtime and/or the developer runtime may include additional functions and/or capabilities that facilitate debugging native code modules.

To ensure the integrity of the execution of the service runtime code, a service request made through the trampoline code of a native code module triggers a stack switch. This stack switch ensures that the stack memory used to execute the service runtime code is not subject to modification by other threads within the native code module.

In one embodiment of the present invention, the service runtime monitors an executing native code module to ensure that the module is not deliberating wasting resources, attempting to distribute system information using covert channels, or performing other mischief. Note that while validating and ensuring the code, control flow, and data integrity of a native code module provides security and thereby eliminates a primary set of threats, a misbehaving native code module can still (either maliciously, or also erroneously) operate inappropriately and waste system resources. For instance, a native code module may include infinite loops or memory leaks, attempt to corrupt client applications using corrupt output, or attempt to convey system state information to external parties using covert channels. To mitigate such issues, the service runtime may incorporate one or more of the following: a loop timer that can stop the execution of a native code module if an infinite loop is detected and/or suspected; a memory limit and tracking system that ensures that the native code module does not attempt to allocate excessive amounts of memory; data integrity checkers that ensure that data output by the native code module follows a valid format (which may involve ensuring that the data output by the native code module is in a format that can feasibly be checked); and techniques that attempt to eliminate or restrict the bandwidth of covert channels, for instance by allowing native client modules to only access a low-precision hardware timer (and thereby preventing the native code module from finely synchronizing a set of covert actions intended to convey information to external parties). Note that while complete elimination of covert channels may be impossible, reducing the bandwidth of such channels can render them harmless.

3. IMC Runtime:

In one embodiment of the present invention, the system allows native code modules to communicate amongst themselves and with external applications. For instance, the IMC runtime can facilitate data-intensive collaboration between a native code module and an external application using shared memory buffers managed by the service runtime. Note that, depending on whether the service runtime is in the same process as the external application, sharing memory buffers may involve translating addresses between processes and managing memory map data. Also, note that because some external applications may be untrusted (e.g., a JavaScript™ application that interacts with a native code module), the system may provide an abstraction for "memory handles" that can be used to access such shared memory buffers (instead of pointers), where the IMC runtime provides mechanisms for translating such handles to addresses.

Because both client applications and native code modules may be multi-threaded, some embodiments of the present invention may involve using mutexes to ensure safe concurrent access to shared memory buffers and prevent data races. Safe concurrent access to shared memory can enable close interaction between a client application and a native code module, and reduce the number of times data needs to be copied for a request. For instance, the native code module can implement a message loop that receives messages and/or requests from client applications and/or the service runtime using such shared memory buffers. Alternatively, the native code module may receive messages from client applications (via the service runtime) that include handles referring to shared memory buffers.

Note also that both sides of the communication may need to perform error checking to ensure the validity of shared data. For instance, the client application may need to thoroughly check data shared with or received from an untrusted native code module to avoid problems caused by buggy or malicious modules. Moreover, client applications should be discouraged from putting data structures that include client-application-sensitive data, such as function pointers and pointers valid only in the parent (client application) address space, into shared memory buffers, because a native code module could potentially modify such data and thereby exploit or negatively affect the client application.

In some embodiments, native code modules may run as threads in the address space of a host process. In these embodiments, system-provided data integrity mechanisms create a privacy sub-domain within the address space of the host process that prevents the thread for the native code module from seeing process memory outside of its sandbox. Moreover, a shared memory segment facilitates information exchange between client applications in the host process and the native code module.

Note that the IMC runtime has direct access to sensitive structures within the service runtime, and potentially also within client applications. Hence, as with the service runtime, ensuring the correctness and security of the IMC runtime is a high priority.

4. Developer Runtime:

In one embodiment of the present invention, the developer runtime provides additional support needed to access aspects of the service runtime from user-developed code in a native code module. As described previously, native code modules interact with the service runtime by making calls from trampolines in the native code module, and the service runtime mediates calls into the native code module by client applications. The developer runtime may include a set of "jacket" routines that prepare any parameters that need to be provided prior to invoking the trampolines. The developer runtime can also provide a main message processing loop and the data structures that are needed to describe the functions and/or functionality available in the native code module to client applications (via the client runtime).

The developer runtime may also include library code that is released as part of a software developer kit and provides developer-transparent support for a set of common functionality. For instance, the developer runtime may include support for functions such as malloc, free, and printf in the context of the secure runtime environment by supplying versions of such functions that correctly route to the service runtime (via trampolines), as opposed to using direct system calls as in existing systems. The library code may also provide support for a full complement of synchronization primitives and atomic operations (e.g., to support shared memory access as described above for the IMC runtime) or enable developers to write to stdout for debugging (e.g., by supporting a modified printf function in the library). Note that some traditionally "standard" system functions, such as fopen, may not apply in the secure runtime environment, and hence may not be supported.

Note that while the developer runtime is considered part of the runtime system that facilitates the native code module accessing the service runtime, the program code relating to the developer runtime is compiled into the native code module itself, and is therefore untrusted. As a result, such program code may not need to be audited to the same level as code in the service and IMC runtimes. Functionality pushed into the developer runtime can automatically benefit from the security assurances provided by the validator and the rest of the secure runtime environment. Note that code from the developer runtime may be statically linked into the native code module.

Figure 6:
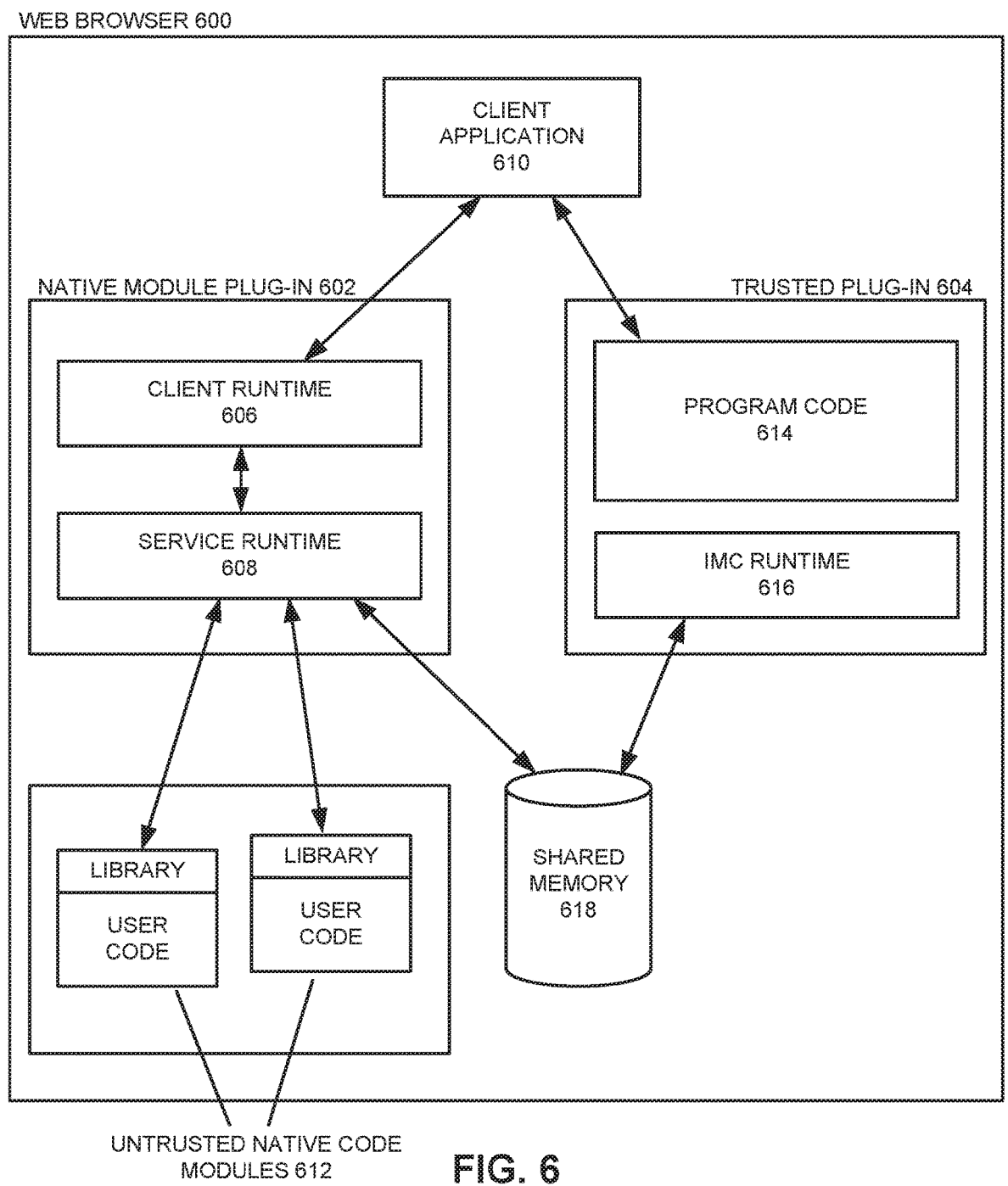
FIG. 6 illustrates untrusted native code modules executing in a secure runtime environment in a web browser in accordance with an embodiment of the present invention.

FIG. 6 illustrates untrusted native code modules executing in an exemplary secure runtime environment in a web browser. In this embodiment, web browser 600 includes a trusted native module plug-in 602 and a second trusted plug-in 604. Native module plug-in 602 includes client runtime 606 and service runtime 608. Note that while client runtime 606 and service runtime 608 are illustrated as independent entities collocated in native module plug-in 602, they may be implemented in a wide range of configurations (e.g., integrated into a single module, or as completely separate applications). During operation, a client application 610 (e.g., a JavaScript™ application) in web browser 600 sends a request to client runtime 606 to download several native code modules. Client runtime 606 forwards this request to service runtime 608, which downloads and loads the untrusted native code modules 612 into memory. After successfully validating, ensuring the integrity of, and setting up structures for untrusted native code modules 612, service runtime 608 notifies client runtime 606 that untrusted native code modules 612 have been loaded, and client runtime 606 in turn informs client application 610 that untrusted native code modules 612 are available. Client application 610 can then query client runtime 606 for the list of calls available for untrusted native code modules 612, and request that such calls be invoked (via client runtime 606 and service runtime 608).

Program code 614 in trusted plug-in 604 may also seek to invoke functionality available in untrusted native code modules 612, prompting the creation of a shared memory segment in shared memory 618 that allows communication between trusted plug-in 604 and untrusted native code modules 612 (via IMC runtime 616 and service runtime 608).

Note that in FIG. 6, only native module plug-in 602 and trusted plug-in 604 are trusted, and that the downloaded client application 610 and untrusted native code modules 612 are untrusted. Note also that while the developer runtime is not explicitly illustrated, it is reflected in the library code and user code of the untrusted native code modules 612. Finally, note that untrusted native code modules 612 cannot interact with each other directly, but can only interact by permission of and via service runtime 608.

Figure 7:
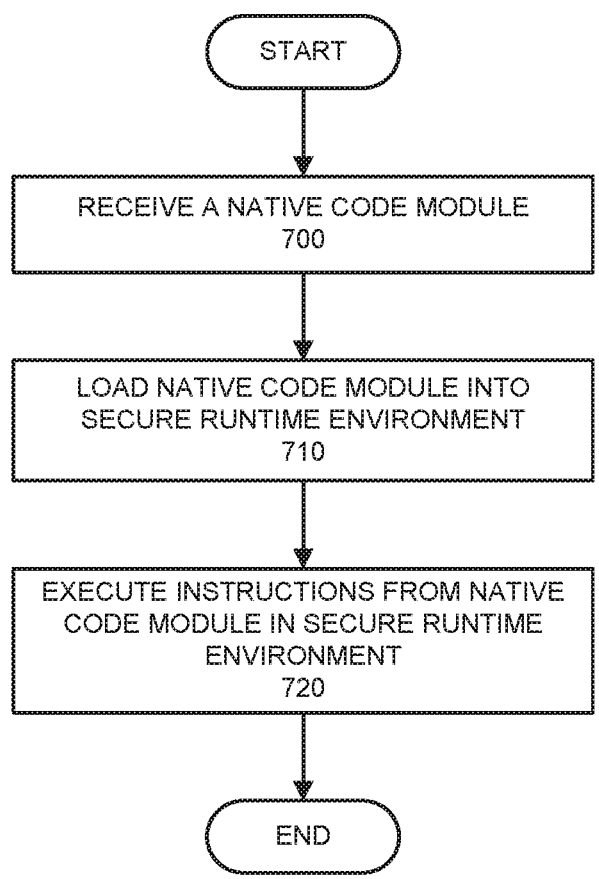
FIG. 7 presents a flow chart illustrating the process of safely executing a native code module on a computing device in accordance with an embodiment of the present invention.

FIG. 7 presents a flow chart illustrating the process of safely executing a native code module on a computing device. During operation, the system receives an untrusted native code module to be executed on a computing device (operation 700). This native code module is comprised of untrusted native program code expressed in the instruction set architecture associated with the computing device. The system loads the native code module into a secure runtime environment that enforces code integrity, control flow integrity, and data integrity for the native code module (operation 710). Then, the system proceeds to execute instructions from the native code module in the secure runtime environment (operation 720). During execution, the secure runtime environment moderates which resources can be accessed by the native code module as well as how these resources are accessed. Executing the native code module in the secure runtime environment facilitates achieving native code performance for untrusted program code without significant risk of unwanted side effects.

Figure 8:
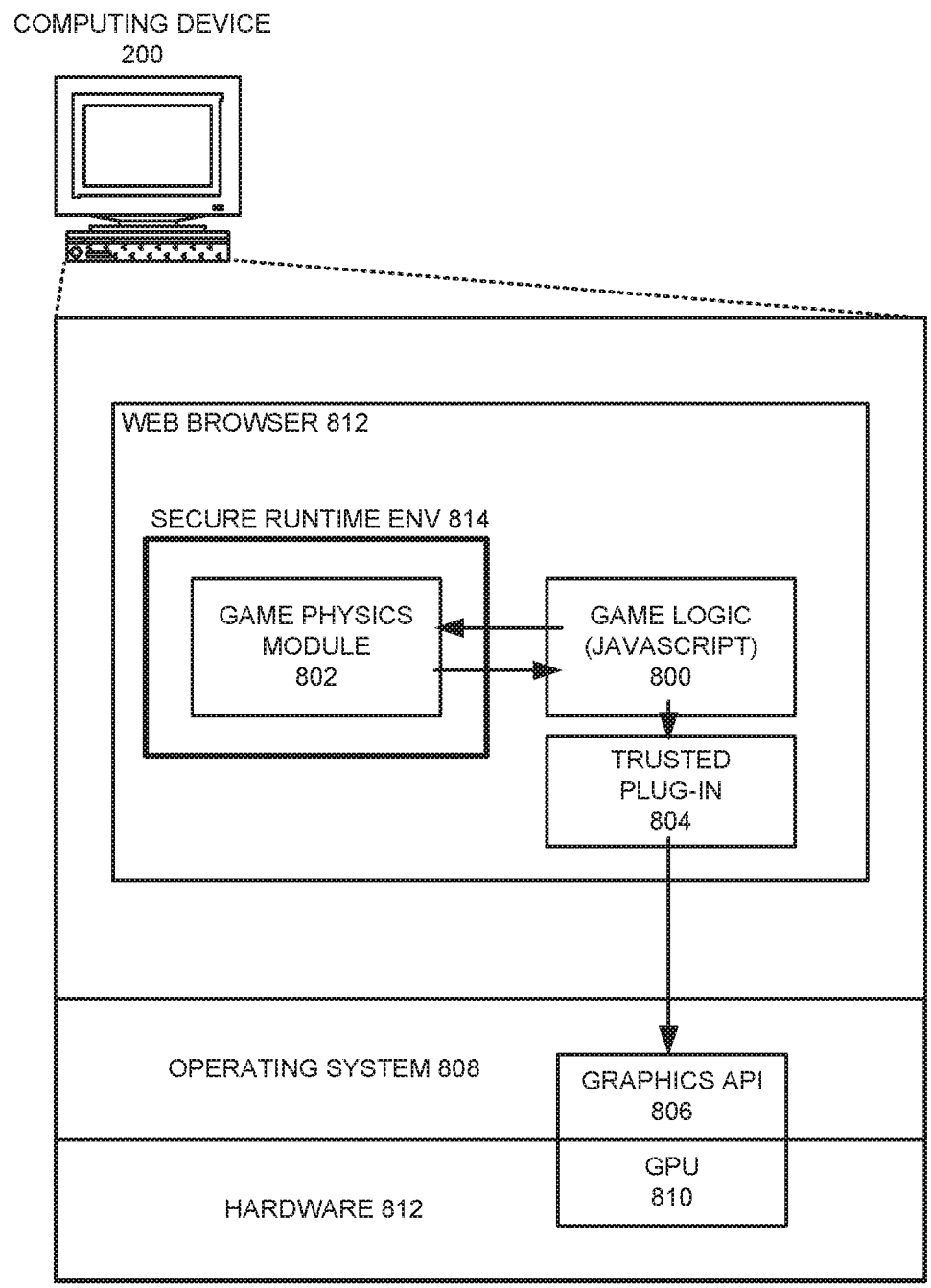
FIG. 8 illustrates an exemplary application that interacts with an executing native code module in accordance with an embodiment of the present invention.

FIG. 8 illustrates a gaming application in web browser 812 that interacts with an executing native code module that comprises both game logic 800 (implemented in JavaScript™) as well as a game physics module 802 that is implemented as an untrusted native code module that executes in secure runtime environment 814. Some aspects of the game may not need native code performance. For instance, game logic 800 may not need native code performance to determine and track mouse motion or keyboard input. However, generating high-resolution graphics at high frame rates may be beyond the performance and language capabilities of JavaScript™. As a result the application may be organized such that game logic 800 sends relevant positioning info (related to mouse actions) to game physics module 802, which generates a set of graphics and/or sound information using secure native code performance. Game logic 800 may include knowledge of how to forward the output of game physics module 802 through another layer (e.g., trusted browser plug-in 804, which provides a browser graphics sub-system) directly to a graphics API (application programmer interface) 806 in operating system 808 and a graphics processing unit 810 in the hardware 812 of computing device 200. Alternatively, game physics module 802 may also be allowed to send graphics data directly to the trusted plug-in (thereby bypassing the JavaScript™ game logic 800 completely) using the above-described communication methods (such as a shared memory buffer). Note that the split of functionality across client applications and native code modules may vary on a per-application basis. For instance, some applications may minimize the amount of functionality implemented in JavaScript™, and push as much functionality as possible to native code modules to optimize performance. Note that native code modules can allow legacy code to be leveraged in client applications without requiring such code to be rewritten in a new language (such as JavaScript™). Re-compiling such legacy code to create a compliant native code module may involve substantially less effort than a complete re-write.

In some embodiments of the present invention, the plug-in that supports the native code module is embedded in the code for a web page in a manner that allows client applications to discover and communicate with the native code modules available in the system. For instance, the plug-in and/or native code modules can be loaded in web documents such that connections for the interfaces of native code modules are exported to the plug-in. A client application can then connect to the plug-in via the document object model to determine connection information for the available native code modules.

Note that in some embodiments of the present invention, the described system is operating-system neutral, thereby facilitating operating system portability. Compiler adjustments (and the subsequent verification by the validator) relate to sets of disallowed instructions (e.g., by instruction opcode) and control flow, which are operating-system independent. Similarly, other system actions can also be implemented to avoid operating-system-specific operations (e.g., because hardware exceptions are often handled in an operating-specific manner, the system may choose to handle hardware exceptions in a uniform, operating-system-neutral way by terminating native code modules that generate hardware exceptions). Note that there is no need to perform virtual instructions/operating or instruction translations for a virtual machine in the operating system, because the instructions in the native code module are in native assembly code already and hence can execute directly on the hardware of the given computing device. An operating-system-neutral approach that is easily portable across different operating systems that run on a common hardware architecture can provide a beneficial intermediate alternative beyond virtual machine environments and interpreted languages, which can provide operating-system and/or instruction-set-architecture neutrality but are slower than native code.

In summary, embodiments of the present invention include a secure runtime environment that facilitates achieving native code performance for untrusted program code without significant risk of unwanted side effects. This secure runtime environment facilitates native code modules that are otherwise securely isolated from the other software and hardware components of a computing device to communicate with other system components in a secure, controlled manner. The secure runtime environment moderates both which resources can be accessed (and communicated with) by the native code module, as well as how such resources are accessed, thereby ensuring that the native code module relies entirely on the secure runtime environment to access system services and cannot perform sensitive operations without explicit mediation.

Variations and Optimizations

While compiling native code modules into binaries customized for a single instruction set sacrifices instruction-set portability, using architecture-specific native code can also provides substantial benefits with respect to improving performance and reducing the size and complexity of the system. For situations where multiple popular operating systems share the same underlying hardware architecture (as with the x86 architecture), a substantial percentage of systems may be able to take advantage of such a native code module, despite the lack of instruction-set portability.

Some embodiments of the present invention provide native code modules that use the native code of other instruction set architectures (e.g., the 64-bit x86, PowerPC, or ARM architectures). In some embodiments, the system may support "fat binaries" for native code modules, which include multiple machine code versions that support different instruction set architectures in the same native code module package. Alternatively, the system may use a binary translator in the loader that supports instruction set portability. As described previously, architectures that do not support hardware-based segmented memory protection may need to use alternative data sandboxing techniques to ensure data integrity.

Some embodiments of the present invention can support different (or multiple) executable formats. For instance, the system may support the ELF format commonly used with Linux™ executables as well as the Win32 format used by Windows™. Such options facilitate developing native code modules by allowing developers to choose from a wider range of preferred development tools. Some embodiments of the present invention support both dynamically-loaded libraries in addition to statically-linked binaries.

In some embodiments of the present invention, the validator checks whether native code modules attempt to use processor-model-specific instruction set extensions (such as different versions of the SSE (Streaming SIMD Extensions) available on some generations of x86 processors). While restricting the use of such instructions may simplify aspects of the validator, this could also potentially limit the performance of native code modules. Therefore, to provide maximum performance, the system may support such extensions by checking (e.g., in the validator) whether any extensions used in a native code module are supported by the hardware of the computing device (e.g., by checking detailed product model and version information, such as a model, model number, and stepping for current Intel processors, to determine the set of supported instructions). For instance, the validator may enforce safety for a native code module by preventing the execution of instructions that are unsupported by and/or undefined for the available hardware of a specific computing device. Because the system is responsible for safety, but the developer is responsible for correctness and performance of the actual program, the validator may in some embodiments simply overwrite unsupported instructions with halt instructions, thereby stopping execution (and preserving security) in the case that an unsupported instruction is found for a computing device. Note that while using the halt instruction (which has a one-byte size in the x86 instruction set architecture) may simplify the implementation of such instruction replacement techniques, other single-byte and/or multi-byte instructions may also be used with similar effect.

In summary, existing techniques for executing untrusted program code typically sacrifice some aspects of programmability, safety, operating system portability, and/or performance. Embodiments of the present invention use hardware and software fault isolation techniques to facilitate executing an untrusted native code module safely and securely on a given set of hardware, thereby protecting a host process and the rest of the host device from malicious behavior by the untrusted module while providing performance which is substantially similar to native code performance. Safe execution of the native code module is achieved via load-time validation and a secure runtime environment, where the validator ensures that a native code module is compliant with a set of instruction restrictions and alignment requirements and the secure runtime environment moderates both which resources can be accessed (and communicated with) by the native code module as well as how such resources are accessed. In one application of these techniques, web-based applications using the described techniques can execute with native performance while resolving the security and portability issues of existing techniques.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
  receiving, by a computing device, a native code module that includes a set of program instructions that match an instruction set architecture of the computing device;

loading the native code module into a memory of the computing device;
identifying, by the computing device, a set of validation criteria that are to ensure safe execution of the native code module on the computing device, wherein the set of validation criteria is specific to the instruction set architecture of the computing device;
determining, by the computing device, after the native code module has been loaded into the memory of the computing device but before the native code module is executed on the computing device, (1) whether the native code module complies with the set of validation criteria that are to ensure safe execution of the native code module on the computing device, and (2) that a set of instructions in the native code module are aligned along byte boundaries such that a specified set of byte boundaries always contain a valid instruction and a set of control flow instructions in the native code module have valid targets; and
in response to determining that the native code module complies with the set of validation criteria and that the set of instructions in the native code module are aligned along the byte boundaries, executing the native code module on the computing device.

2. The computer-implemented method of claim 1, wherein:
the instruction set architecture of the computing device is an x86 instruction set architecture, and
the set of validation criteria is specific to the x86 instruction set architecture.

3. The computer-implemented method of claim 2, wherein determining whether the native code module complies with the set of validation criteria includes analyzing the native code module to determine whether the set of program instructions includes any disallowed program instructions from a set of disallowed program instructions.

4. The computer-implemented method of claim 3, wherein the set of disallowed program instructions includes at least one of a syscall (system call) or int (interrupt) instruction.

5. The computer-implemented method of claim 3, wherein the set of disallowed program instructions includes instructions that modify an x86 segment state.

6. The computer-implemented method of claim 3, wherein the set of disallowed program instructions includes at least one of rdtsc (read time stamp counter) or redmsr (read from model specific register) instructions.

7. The computer-implemented method of claim 3, wherein the set of disallowed program instructions includes a ret (return) instruction.

8. The computer-implemented method of claim 3, wherein the set of disallowed program instructions includes an indirect control flow instruction that transfers execution of the native code module to an arbitrary location in memory.

9. The computer-implemented method of claim 1, wherein the computing device is configured, in response to determining that the native code module does not comply with the set of validation criteria that are to ensure safe execution of the native code module on the computing device, to block execution of the native code module.

10. The computer-implemented method of claim 1, wherein the native code module is executed on the computing device in a runtime environment by providing a limited interface between the native code module and other software entities and hardware resources on the computing device, the limited interface moderating external requests made by the native code module.

11. A non-transitory computer-readable storage medium storing instructions that when executed by a computing device cause the computing device to perform a method, the method comprising:
receiving, by the computing device, a native code module that includes a set of program instructions that match an instruction set architecture of the computing device;
loading the native code module into a memory of the computing device;
identifying, by the computing device, a set of validation criteria that are to ensure safe execution of the native code module on the computing device, wherein the set of validation criteria is specific to the instruction set architecture of the computing device;
determining, by the computing device, after the native code module has been loaded into the memory of the computing device but before the native code module is executed on the computing device, (1) whether the native code module complies with the set of validation criteria that are to ensure safe execution of the native code module on the computing device, and (2) that a set of instructions in the native code module are aligned along byte boundaries such that a specified set of byte boundaries always contain a valid instruction and a set of control flow instructions in the native code module have valid targets; and
in response to determining that the native code module complies with the set of validation criteria and that the set of instructions in the native code module are aligned along the byte boundaries, executing the native code module on the computing device.

12. The storage medium of claim 11, wherein:
the instruction set architecture of the computing device is an x86 instruction set architecture, and
the set of validation criteria is specific to the x86 instruction set architecture.

13. The storage medium of claim 12, wherein determining whether the native code module complies with the set of validation criteria includes analyzing the native code module to determine whether the set of program instructions includes any disallowed program instructions from a set of disallowed program instructions.

14. The storage medium of claim 13, wherein the set of disallowed program instructions includes at least one of a syscall (system call) or int (interrupt) instruction.

15. The storage medium of claim 13, wherein the set of disallowed program instructions includes instructions that modify an x86 segment state.

16. The storage medium of claim 13, wherein the set of disallowed program instructions includes at least one of rdtsc (read time stamp counter) or redmsr (read from model specific register) instructions.

17. The storage medium of claim 13, wherein the set of disallowed program instructions includes a ret (return) instruction.

18. The storage medium of claim 13, wherein the set of disallowed program instructions includes an indirect control flow instruction that transfers execution of the native code module to an arbitrary location in memory.

19. The storage medium of claim 11, wherein the computing device is configured, in response to determining that the native code module does not comply with the set of validation criteria that are to ensure safe execution of the native code module on the computing device, to block execution of the native code module.

20. A computing device, comprising:
a processor; and
a non-transitory computer-readable medium having instructions stored thereon that, when executed by the processor, cause the processor to perform operations comprising:
receiving, by the computing device, a native code module that includes a set of program instructions that match an instruction set architecture of the computing device;
loading the native code module into a memory of the computing device;
identifying, by the computing device, a set of validation criteria that are to ensure safe execution of the native code module on the computing device, wherein the set of validation criteria is specific to the instruction set architecture of the computing device;
determining, by the computing device, after the native code module has been loaded into the memory of the computing device but before the native code module is executed on the computing device, (1) whether the native code module complies with the set of validation criteria that are to ensure safe execution of the native code module on the computing device, and (2) that a set of instructions in the native code module are aligned along byte boundaries such that a specified set of byte boundaries always contain a valid instruction and a set of control flow instructions in the native code module have valid targets; and
in response to determining that the native code module complies with the set of validation criteria and that the set of instructions in the native code module are aligned along the byte boundaries, executing the native code module on the computing device.

* * * * *